United States Patent
Argouarch et al.

(10) Patent No.: US 7,602,842 B2
(45) Date of Patent: Oct. 13, 2009

(54) DIGITAL SIGNAL TRANSMISSION SYSTEM

(75) Inventors: Francis Argouarch, Brest (FR); Stéphane Cournut, Brest (FR); Jean Luc Guevel, Brest (FR); Jean François Leroy, Gouesnou (FR)

(73) Assignee: Alcatel, Paris (FR)

( * ) Notice: Subject to any disclaimer, the term of this patent is extended or adjusted under 35 U.S.C. 154(b) by 707 days.

(21) Appl. No.: 10/142,053

(22) Filed: May 10, 2002

(65) Prior Publication Data

US 2002/0191708 A1 Dec. 19, 2002

(30) Foreign Application Priority Data

Jun. 18, 2001 (FR) .................................. 01 07957

(51) Int. Cl.
*H04B 1/38* (2006.01)
*H04B 14/04* (2006.01)
(52) U.S. Cl. ....................................... 375/219; 375/242
(58) Field of Classification Search ................. 375/219, 375/220, 222, 242, 257, 259, 356, 377; 370/277–279
See application file for complete search history.

(56) References Cited

U.S. PATENT DOCUMENTS

| | | | |
|---|---|---|---|
| 6,112,103 A * | 8/2000 | Puthuff ....................... | 455/557 |
| 6,408,019 B1 * | 6/2002 | Pickering et al. ............. | 375/130 |
| 6,498,806 B1 * | 12/2002 | Davis .......................... | 375/222 |
| 6,567,653 B1 * | 5/2003 | Sanders ....................... | 455/126 |
| 6,570,871 B1 * | 5/2003 | Schneider ................... | 370/356 |
| 6,785,267 B1 * | 8/2004 | Knappe ....................... | 370/353 |
| 6,904,083 B2 * | 6/2005 | Young et al. ................. | 375/222 |
| 6,950,461 B2 * | 9/2005 | Goldstein et al. ............ | 375/222 |
| 2002/0001317 A1 * | 1/2002 | Herring ....................... | 370/493 |
| 2002/0101965 A1 * | 8/2002 | Elzur ........................... | 379/93.01 |

FOREIGN PATENT DOCUMENTS

EP 0 462 728 A2 12/1991

OTHER PUBLICATIONS

M. Hein, "SS7-Gateways", Funkschau, Franzir-Verlag K.G. Munchen, Germany, vol. 72, No. 3 Jan. 22, 1999, pp. 68-70 XP000833879.

* cited by examiner

*Primary Examiner*—Young T. Tse
(74) *Attorney, Agent, or Firm*—Sughrue Mion, PLLC

(57) ABSTRACT

In a system for transmitting digital signals between two equipment units of a mobile radio network in accordance with a digital transmission protocol, the equipment units are interconnected by an analog link. The system includes digital-analog converters for converting the digital signals into an analog form and transmitting the converted digital signals on the analog link and analog-to-digital converters for reception of the analog signals and converting the received signal into digital form by one of the equipment units.

18 Claims, 1 Drawing Sheet

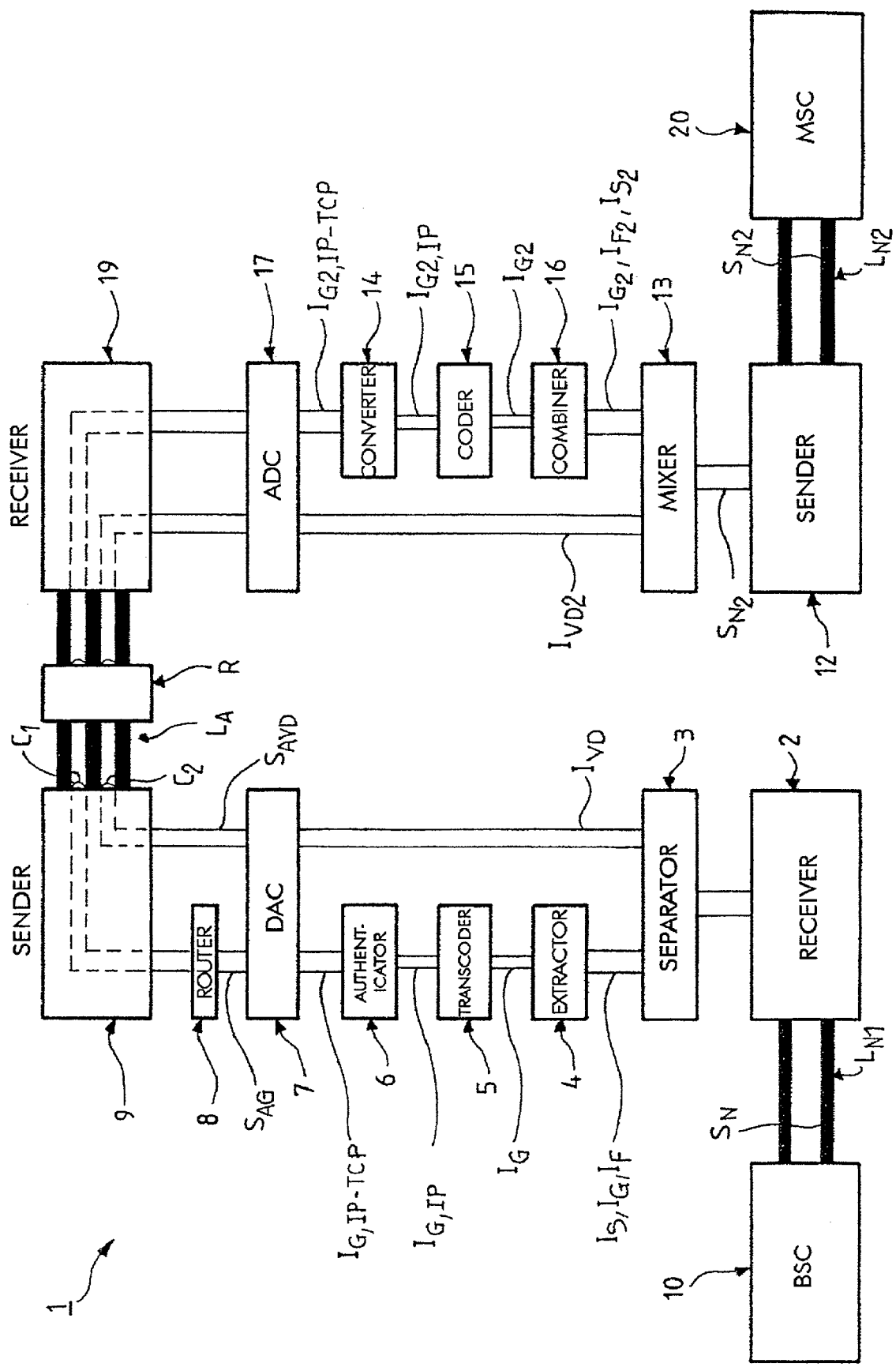

DIGITAL SIGNAL TRANSMISSION SYSTEM

CROSS-REFERENCE TO RELATED APPLICATIONS

This application is based on French Patent Application No. 01 07 957 filed Jun. 18, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to mobile radio systems. To be more precise, it relates to a system for transmitting digital signals between two equipment units of a mobile radio network.

2. Description of the Prior Art

To respond to the multiplicity of new services, telecommunication networks such as ISDN (Integrated Services Digital Network) fixed telephone networks and GSM (Global System for Mobile communication) and PCS (Personal Communication System) mobile telephone networks convey digital signals in accordance with a digital transmission protocol. This is known in the art.

The digital links of such networks, for example pulse code modulation (PCM) links, transport each digital signal independently and in the form of packets containing both signaling information associated with the processing of a call and voice and/or data information.

Digital links of the above kind are used at an interface between two equipment units to enable interworking thereof, for example. One prior art example of this is the A interface which in GSM and PCS networks connects a mobile-services switching center (MSC) and a base station controller (BSC).

There are still many areas with no digital links, mainly because the latter necessitate specific and costly transmission infrastructures and sophisticated signal processing software.

The economic factor is therefore retarding in particular the expansion of networks such as GSM and PCS networks. For example, in the case of an A interface, installing a base station controller (BSC) and upgrading a conventional telephone exchange (e.g. a landline telephone exchange) for conformance with GSM and PCS networks are relatively low cost operations. On the other hand, installing the digital link supporting the digital protocol to the MSC is costly.

An object of the present invention is to provide a less costly and more flexible transmission system by adapting the pre-defined digital transmission protocol, to facilitate the deployment of mobile radio networks.

SUMMARY OF THE INVENTION

To this end the present invention proposes a system for transmitting digital signals between two equipment units of a mobile radio network in accordance with a digital transmission protocol, wherein the equipment units are interconnected by an analog link and the system includes digital-to-analog converter means for transmitting the signals on the analog link and analog-to-digital converter means for reception of the signals by one of the equipment units in digital form.

The transmission system according to the invention uses a pre-existing analog link that was not originally intended to transmit digital signals. The analog link is part of a fixed public switched telephone network (PSTN), for example, or a satellite network.

For example, after installation of BSC and possibly adaptation of MSC for conformance with the GSM and PCS networks, the transmission system according to the invention enables the installation of an A interface. BSC can also be installed in some areas of under-equipped countries, for example, or at sea, on an oil platform or a ship, or in the air, on an aircraft, to provide a connection to the geographically closest MSC or to pre-existing exchanges that have been adapted. This extends the coverage of GSM and PCS networks.

The transmission system according to the invention can advantageously further include means for receiving the digital signals from a first of the equipment units and/or both of the equipment units and, the digital signals including signaling information and voice and/or data information, means for separating the signaling information and the voice and/or data information.

According to the invention, the signaling information can contain management information and authenticated transmission information. The authenticated transmission information includes the physical characteristics of the digital links used in the prior art and elements for authenticating the transmission of management information.

Accordingly, in this case, the system according to the invention can further include:

means for extracting the management information, the digital-to-analog converter means converting the management information extracted by the extractor means to obtain analog management information having a bandwidth compatible with the analog link, and means for sending the analog management information over a circuit of the analog link.

In this way, only management information is conveyed, i.e. information necessary to the operation of the communication network. In particular, this increases the transmission bit rate of the analog link.

Furthermore, the conversion means used for the management information can include an analog modem, for example. The function of the modem at the output of the first equipment unit is to modulate a carrier frequency which is, for example, at the center of the spectrum used in conventional telephony (300-3400 Hz) and thus enables management information to be transported by the analog link, while the modem at the input of the second equipment unit demodulates the carrier frequency to receive management information in digital form.

One embodiment of the transmission system according to the invention can further include means for transcoding the management information in accordance with another digital protocol of the Internet Protocol type and preceding the digital-to-analog converter means.

As a general rule, signals conforming to the Internet Protocol (IP) also contain information to be transmitted and the Internet Protocol operates in accordance with the packet switching principle.

The structure of a signal conforming to the Internet Protocol is fairly close to the structure conforming to the digital protocol. Transcoding therefore presents no particular difficulties. Once transcoded in accordance with the Internet Protocol, the information has the advantage of being easy to convert and convey over an analog link.

In this embodiment, the transmission system can include means for authenticating transcoded management information, in accordance with a digital transfer control protocol (TCP) associated with the Internet Protocol, to obtain so-called authenticated signaling information.

As a general rule, the TCP adds supplementary call control information to IP signals.

Thus the TCP provides authenticated signaling information because the latter information replaces the authenticated transmission information conforming to the initial digital protocol that was eliminated by the means for extracting control information.

In this latter embodiment, the digital-analog converter means and the analog-digital converter means convert authenticated management information.

Moreover, in this case, the system according to the invention can include means for converting authenticated management information into transcoded management information and means for coding transcoded management information into management information conforming to the digital transmission protocol.

The system according to the invention can include means for mixing signaling information with voice and/or data information for reception by one of the equipment units.

Because the management information can belong to either of two separate categories, the system according to the invention can include means for routing management information in accordance with its category.

This applies to an A interface, for example, based on Signaling System Number 7 (SS7). Thus A interface management information in a first category relates to the management of users (identification, rights, etc.) and to maintenance. This means information exchanged between BSC and MSC, i.e. directly generated or interpreted by one or other of the two equipment units. The information in a second category relates to managing calls (call request, clearing down, etc.) between mobile stations (MS) and MSC via the BSC. This information is transparent to the BSC, which serves as a simple repeater, forwarding management information it receives without interpreting its content.

The information in each category is differentiated by discrimination information. Thus the routing means according to the invention are capable of indicating the path to be used on the basis of the discrimination information.

According to the invention, the digital-to-analog converter means can further convert voice and/or data information to obtain analog voice and/or data information having a bandwidth compatible with the analog link and the transmission system can include means for sending analog voice and/or data information over a circuit of said analog link.

The mobile radio network according to the invention can be a GSM network or a PCS network.

According to the invention, a first equipment unit can include one or more base transceiver stations (BTS) and a base station controller (BSC) and a second equipment unit is a mobile-services switching center (MSC).

The BTS is responsible for radio transmission and carries out all the radio measurements needed to verify that a call in progress is proceeding correctly. The BTS also manages the exchange of signaling information between mobiles.

The main function of the BSC is to manage the radio resource. It also concentrates the circuits to the MSC.

The MSC also manages the setting up of calls between mobiles and other MSC.

According to the invention, the digital transmission protocol can be the A interface protocol.

According to the invention, the analog link can be part of a network chosen from the group comprising a radio network, a satellite network and a landline network.

The features and objects of the present invention will emerge from the detailed description given hereinafter with reference to the accompanying drawing, which is provided by way of nonlimiting and illustrative example only.

BRIEF DESCRIPTION OF THE DRAWING

The single FIGURE of the accompanying drawing is a diagrammatic representation of a transmission system according to the invention.

DETAILED DESCRIPTION OF THE PREFERRED EMBODIMENT

The FIGURE shows a system 1 in accordance with the invention for transmitting digital signals $S_N$ between two equipment units 10, 20. The first equipment unit 10 is a base station controller (BSC) and the second equipment unit 20 is a mobile-services switching center (MSC) of a GSM or PCS mobile radio network using an A interface digital transmission protocol.

The equipment units 10, 20 are interconnected by two short PCM digital link sections $L_{N1}$ and $L_{N2}$ respectively located at the output of the BSC 10 and at the output of the MSC 20. Between the links $L_{N1}$ and $L_{N2}$ there is an analog link $L_A$ including a plurality of communication circuits $c_1$ and $c_2$ of an analog communication network R.

The system 1 further includes a set of means with different functions used successively to transmit a signal from one equipment unit to the other, located at the BSC 10 end between $L_{N1}$ and R and at the MSC 20 end between R and $L_{N2}$.

The means just referred to are described below in the order in which they are used, taking the BSC 10 as the starting point and specifying the path taken as well as the changes affecting digital signals $S_N$.

For example, the digital signals $S_N$ contain signaling information $I_S$ and voice and/or data information $I_{VD}$. Also, the signaling information $I_S$ includes management information $I_G$ and authenticated transmission information $I_F$ conforming to the A interface digital protocol. The authenticated transmission information $I_F$ includes the physical characteristics of the digital links used and management information transmission authentication elements.

Note that the GSM network has a layered architecture and that the authenticated transmission information $I_F$ is contained in the message transfer part (MTP) layer.

The first means used are means 2 for receiving the digital signals $S_N$ sent by the BSC 10 and transmitted over the digital link section $L_{N1}$.

Next there are means 3 for separating signaling information $I_S$ and voice and/or data information $I_{VD}$, followed by means 4 for extracting the management information $I_G$ from the signaling information $I_S$.

Transcoding means 5 conforming to the Internet Protocol (IP) convert the management information $I_G$ into transcoded management information $I_{G,IP}$. The means 5 are associated with authentication means 6 based on the transfer control protocol (TCP) producing authenticated management information $I_{G,IP\text{-}TCP}$.

Next, digital-to-analog converter means 7 convert the authenticated management information $I_{G,IP\text{-}TCP}$ and the voice and/or data information $I_{VD}$ into analog signals $S_{AG}$ and $S_{AVD}$ with bandwidths compatible with the analog link $L_A$.

Also, the management information belongs to two separate categories of the A interface, i.e. the base station system management application part (BSSMAP), which controls the dialog between BSC and MSC for all the management information relating to the radio resource, and the direct transfer application part (DTAP) layer, which makes the BSC transparent to the management information between the MS and the MSC. The system 1 therefore includes means 8 for routing the management information according to its category.

Sending means 9 transfer the analog signals $S_{AG}$ and $S_{AVD}$ over respective circuits $c_1$ and $c_2$ of the analog link $L_A$ to receiver means 19 at the MSC 20 end.

Analog-to-digital converter means 17 convert the analog signal $S_{AG}$ into authenticated management information $I_{G2,IP\text{-}TCP}$ and the analog signal $S_{AVD}$ into voice and/or data information $I_{VD2}$.

The means 17 are followed by converter means 14 whose function is to eliminate information associated with authentication in accordance with the TCP in order to obtain transmitted management information $I_{G2,IP}$.

Next, coding means 15 replace the transcoded management information $I_{G2,IP}$ with management information $I_{G2}$ in accordance with the digital A interface protocol.

To authenticate this management information conforming to the A interface protocol, combiner means 16 add finalized transmission information $I_{F2}$ to the management information $I_{G2}$ to form signaling information $I_{S2}$.

Finally, means 13 for mixing the signaling information $I_{S2}$ with the voice and/or data information $I_{VD2}$ followed by sending means 12 enable reception of a signal $S_{N2}$ by the MSC 20 via the digital link section $L_2$.

Note that, because transmission is bidirectional, all of the means previously described can exist in the vicinity of each of the equipment units 10, 20.

The foregoing description has been given by way of purely illustrative example, of course. Any means can be replaced by equivalent means without departing from the scope of the invention.

There is claimed:

1. A transmission system for transmitting digital signals between a first equipment unit and a second equipment unit of a mobile radio network in accordance with a digital transmission protocol, said first equipment unit and said second equipment unit interconnected by an analog link, the transmission system comprising:
   means for separating said digital signals into portions, said portions comprising signaling information and voice and/or data information;
   digital-to-analog converter means for converting said signaling formation and said voice and/or data information into analog signals and for transmitting said converted analog signals on said analog link from the first equipment unit of the mobile radio network; and
   analog-to-digital converter means for reception of said transmitted analog signals by the second equipment unit of the mobile radio network and for converting said transmitted analog signals into digital form;
   wherein the first equipment unit and the second equipment unit are connected via said analog link, and
   wherein the analog signals of the separated portions of said digital signals are transmitted via said analog link, separately.

2. The transmission system claimed in claim 1, further comprising means, coupled to said seperations for receiving said digital signals from said first equipment unit, where said digital signals comprise said signaling information and said voice and/or data information.

3. The transmission system claimed in claim 2, wherein said digital-to-analog converter means converts said voice and/or data information into a voice or data analog signal having a bandwidth compatible with said analog link and further comprising means for sending said voice or data analog signal over a circuit of said analog link.

4. The transmission system claimed in claim 2, wherein said signaling information comprises management information and authenticated transmission information and the transmission system further comprising means for extracting said management information.

5. The transmission system claimed in claim 4, wherein said management information comprises one of base station system management application part (BSSMAP) and direct transfer application part (DTAP) layer, and the transmission system further comprising sender routing means for routing an analog management information of said transmitted analog signals in accordance with one of the BSSMAT and DTAP layer.

6. The transmission system claimed in claim 4, further comprising means for transcoding said extracted management information in accordance with another digital transmission protocol of Internet Protocol type and preceding said digital-to-analog converter means.

7. The transmission system claimed in claim 6, further comprising means for authenticating said transcoded management information in accordance with a digital transfer control protocol associated with said Internet Protocol type and obtaining authenticated management information.

8. The transmission system claimed in claim 7, wherein said digital-to-analog converter means converts said authenticated management information and said voice and/or data information into said analog signals.

9. The transmission system claimed in claim 7 further comprising:
   receiver converting means for converting said authenticated management information into received transcoded management information, and
   receiver coding means for coding said received transcoded management information into received management information conforming to said digital transmission protocol.

10. The transmission system claimed in claim 9, further comprising receiver mixing means for mixing said received management information with voice and/or data information received from the analog-to-digital converter means for reception by said second equipment unit.

11. The transmission system claimed in claim 1, wherein said network is one of a Global System for Mobile communication (GSM) network and a Person Communication System (PCS) network.

12. The transmission system claimed in claim 1, wherein the first equipment unit comprises at least one of a base transceiver station and a base station controller, and wherein the second equipment unit comprises a mobile-services switching center.

13. The transmission system claimed in claim 1, wherein said analog link is part of a network chosen from a group consisting of a radio network, a satellite network, and a landline network.

14. A system for transmitting digital signals between a first equipment unit and a second equipment unit of a mobile radio network in accordance with a digital transmission protocol, said first equipment unit and said second equipment unit interconnected by an analog link, the system comprising:
   a separating module separating the digital signals into portions, said portions comprising signaling information and voice and/or data information;
   a digital-to-analog converter converting the signaling information and the voice and/or data information into analog signals; and an analog-to-digital converter converting said analog signals into digital form, wherein the first equipment unit and the second equipment unit are connected via said analog link and wherein the analog signals of the separated portions of said digital signals are transmitted via said analog link, separately.

15. The system according to claim 14, wherein said signaling information comprises management information and authenticated transmission information and the system further comprising an extractor extracting said management information.

16. The system according to claim 15, further comprising a transcoder transcoding the extracted management information in accordance with an internet protocol.

17. The system according to claim 16, further comprising an authenticating module authenticating said transcoded management information.

18. A method for transmitting digital signals between a first equipment unit and a second equipment unit of a mobile radio network in accordance with a digital transmission protocol, said first equipment unit and said second equipment unit interconnected by an analog link, the method comprising:

separating said digital signals into portions, said portions comprising signaling information and voice and/or data information;

converting, by a digital-to-analog converter, said signaling information and said voice and/or data information from the first equipment unit of the mobile radio network into analog signals;

transmitting said analog signals on said analog link; and converting, by an analog-to-digital converter, said transmitted analog signals into digital form, said converted analog signals received by the second equipment unit of the mobile radio network, wherein the analog signals of the separated portions of said digital signals are transmitted separately.

* * * * *

UNITED STATES PATENT AND TRADEMARK OFFICE
CERTIFICATE OF CORRECTION

PATENT NO. : 7,602,842 B2  Page 1 of 1
APPLICATION NO. : 10/142053
DATED : October 13, 2009
INVENTOR(S) : Argouarch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Fifth Day of October, 2010

David J. Kappos
*Director of the United States Patent and Trademark Office*